(No Model.)

R. McLAUGHLIN.
AXLE FOR VEHICLES.

No. 337,605. Patented Mar. 9, 1886.

Witnesses.
J. Mulock Jackson
Jas. E. Maybee

Inventor.
Robert McLaughlin
by Donald C. Ridout
Atty

UNITED STATES PATENT OFFICE.

ROBERT McLAUGHLIN, OF OSHAWA, ONTARIO, CANADA.

AXLE FOR VEHICLES.

SPECIFICATION forming part of Letters Patent No. 337,605, dated March 9, 1886.

Application filed October 9, 1885. Serial No. 179,416. (No model.) Patented in Canada August 26, 1885, No. 22,304.

*To all whom it may concern:*

Be it known that I, ROBERT MCLAUGHLIN, a subject of the Queen of Great Britain, residing in the town of Oshawa, in the county of Ontario, in the Province of Ontario, Canada, have invented a certain new and useful Improvement in the Running-Gear of Vehicles, of which the following is a specification.

The object of the invention is to design means for deadening or stopping the rattling noise caused by the revolving or moving parts of the running-gear; and it consists, essentially, of a washer or washers made of rubber or other elastic material, and placed on the axle or other stationary part, a brass or metal washer or washers being placed against the elastic washer, so as to interpose between it and the revolving or moving part, substantially as hereinafter more particularly explained.

Figure 1:
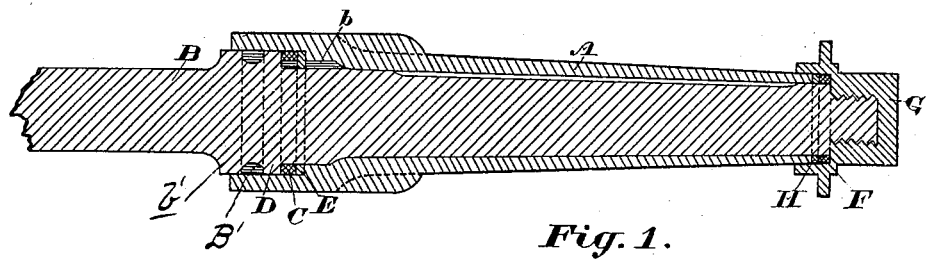
Figure 2:
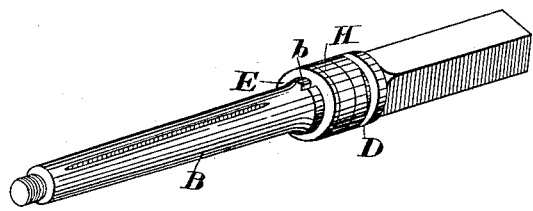
Figure 3:
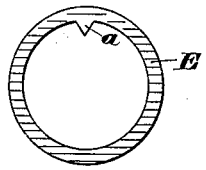
Figure 4:
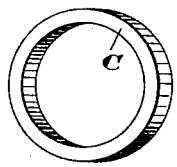
Figure 5:
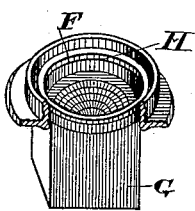

Figure 1 is a sectional elevation of an axle and axle-box provided with my noiseless attachment. Fig. 2 is a detail of the axle. Fig. 3 is a detail of the metal washer to fit on the axle. Fig. 4 is a detail of the rubber washer. Fig. 5 is a detail of the nut.

For the purpose of illustrating my invention, I exhibit it applied to an axle and axle-box, although it will be applicable to other parts of the gear.

A represents an ordinary axle-box fitted onto the axle B, which is also of the usual form.

C is a washer made of rubber or other elastic material and fitted onto the axle B so as to press against the axle-collar D.

E is a washer made of brass or metal of suitable description. This washer E is provided with a lip, *a*, designed to fit into the groove *b* made in the axle B.

F is a washer made of rubber or other suitable material, and fitted into the recess formed in the nut G.

The washer H, which fits against the washer F in the nut G, is made of brass or metal of suitable description, and is suitably held in position within the recess in the nut G, so that it will neither drop out itself or permit the washer F to leave its place.

When the axle-box A is placed in position, the nut G may be screwed sufficiently tight to prevent any longitudinal motion of the axle-box upon its axle, while at the same time the yielding nature of the washers C and F prevents the axle-box being jammed. Consequently no rattling noise will be caused by the motion of the axle-box, nor will it be held so tightly as to retard its free revolving motion.

Owing to the position of my rubber and metal washers, as described, the metal washers form substantial frictionless rubbing-blocks, while the rubber washers form elastic cushions which permit tight joints to be made without their being so tight as to retard the free movement of the parts secured in position by them.

As both rubber and metal washers are held stationary on the parts they are connected to, the axle-box or moving part may be removed without any fear of the washers dropping out or being lost.

I am aware of the Patent No. 235,772, and make no claim to the construction shown therein, as forming part of my invention.

By my construction I dispense with the leather washers *s s'* employed in the patent above referred to.

I am also aware that flanged guards have been made with lips on their inner and outer circumferences to receive a washer; but such construction is foreign to my invention. My lip *a* is formed integral with the washer and fits into a groove in the axle to hold said washer in place and prevent its turning.

It will be observed that the axle B has formed integral therewith, in addition to the collar D, an annular bearing, *b'*, of the same diameter as that of the said collar, the space between said collar and bearing being concaved, as shown, to form a lubricant-chamber, B'. The washer E is of the same diameter as the before-mentioned collar and bearings, so that when the box A is in place upon the axle it has a bearing upon said collar, annular bearing, and washer. This is important, as it provides a firm bearing for said axle-box at this point, and avoids all tendency of the latter to become out of true.

What I claim as my invention is—

The combination, with the axle B, provided with groove *b*, and having formed integral therewith the collar D, and annular bearing *b'*, of the same diameter as said collar, and annular lubricant-chamber between said collar and bearing, of the rubber washer C, bearing against said collar, the metal washer E, of the same diameter as said collar and annular
5 bearing, and provided with lip $a$ to fit said groove, and the axle-box A, sleeved on said axle, and having enlarged recess receiving said collar, bearing, and washers, and bearing upon the same, substantially as described.

Oshawa, October 1, 1885.

ROBERT McLAUGHLIN.

In presence of—
 FRAS. GILBERT,
 R. McGEE.